United States Patent [19]

Tarlton, deceased et al.

[11] Patent Number: 5,084,226

[45] Date of Patent: Jan. 28, 1992

[54] METHOD OF SHAPING SHEETS USING GRAVITY

[75] Inventors: Kelvin E. Tarlton, deceased, late of Epsom, by Rosemary J. Tarlton, legal representative; Anthony J. Crang, Epsom, both of New Zealand

[73] Assignee: Tarlton Aquastar Limited Partnership, San Francisco, Calif.

[21] Appl. No.: 522,461

[22] Filed: May 14, 1990

Related U.S. Application Data

[63] Continuation of Ser. No. 91,392, Aug. 31, 1987, abandoned.

[30] Foreign Application Priority Data

Aug. 29, 1986 [NZ] New Zealand .......... 217.405

[51] Int. Cl.$^5$ ............................................. B29C 53/04
[52] U.S. Cl. ..................................... 264/316; 264/2.7; 264/322
[58] Field of Search ............... 264/316, 322, 324, 505, 264/544, 546, 2.7, 320, 339; 156/99, 102

[56] References Cited

U.S. PATENT DOCUMENTS 1,815,992 7/1931 Sherts et al. ................. 156/102
3,044,117 7/1962 Alspach ........................ 425/384
3,231,647 1/1966 Oesterheld .................... 425/396
4,231,827 11/1980 Wilson et al. ................. 264/320
4,390,489 6/1983 Segal ............................ 264/322
4,576,776 3/1986 Anderson ..................... 264/546

FOREIGN PATENT DOCUMENTS 8607005 12/1986 PCT Int'l Appl.
1237210 6/1971 United Kingdom.
2095606 10/1982 United Kingdom.
2155845 10/1985 United Kingdom.

Primary Examiner—Jan H. Silbaugh
Assistant Examiner—Catherine Timm
Attorney, Agent, or Firm—Sandler, Greenblum & Bernstein

[57] ABSTRACT

Method and apparatus for forming thermoplastic materials provides for supporting a sheet of thermoplastic material on a support spanning a former, heating the sheet of thermoplastic material to a predetermined temperature to render the thermoplastic material plastic, thereby permitting the support and the sheet of thermoplastic material supported thereon to depend downwardly by gravity into the former, and allowing the sheet of thermoplastic material to cool in a shape at least partially defined by the former.

5 Claims, 1 Drawing Sheet

METHOD OF SHAPING SHEETS USING GRAVITY

This application is a continuation, of application Ser. No. 07/091,392, filed Aug. 31, 1987 now abandoned.

This invention relates to method and apparatus of forming settable materials and more particularly to methods and apparatus for forming settable material into predetermined shapes.

In the past, there has been a difficulty in forming material into predetermined, controlled shapes. For example, there has been difficulty in forming thick sheets of thermoplastic materials such as acrylic and the like, into a portion of a cylinder. Such forming of thick sheets is desirable in underwater viewing tunnels through tanks, such as, for example, fish tanks and the like, as used in public attrations where fish may be viewed through the roof of a tunnel through a tank.

In the past, method and apparatus for forming such tunnel roofs and other items such as transparent corners of buildings and the like, have experienced problems resulting in final products which are relatively inaccurate in dimension. Thus, these final products require support structures that have a capacity for accommodating relatively wide tolerances. This which has lead to problems with sealing and in some cases structural integrity of the item. Further, the design tolerances often lead to increased cost in view of their need to accommodate variance in size.

A further problem arises in that frequently the moulded structures are somewhat less than desirable from an optical point of view. This is particularly disadvantageous in cases where the formed product is intended for viewing through the formed structure, particularly in the case of a tunnel roof for a fish tank where variances in shape, thickness and the like tend to cause distortion of vision.

Substantial difficulties are encountered as a result of the size, weight and thickness of material from which the viewing roofs are constructed. This also leads to problems in the method and apparatus for forming such structures.

It is an object of this invention to overcome the abovementioned problems or at least provide the public with a useful choice.

Other objects of this invention will become apparent from the following description.

According to one aspect of this invention, there is provided a method of forming a thermoplastic material including supporting a sheet of thermoplastic material on a support spanning a former, heating at least said thermoplastic material to a predetermined temperature to render said thermoplastic material thermoplastic, causing bending of said support and said thermoplastic sheet supported thereon into said former and allowing said thermoplastic material to cool in a shape at least partially defined by said former.

This method may further include the step of holding said thermoplastic material in the formative position in said former during cooling of said thermoplastic material.

Moreover, a sleeve portion may be positioned between said support and said thermoplastic material.

Additionally, an oven may be positioned into which said former and said thermoplastic material are moved.

In practicing the method according to the invention the support may be maintained in a supporting condition by providing an outward tension on said support member. Furthermore, such outward tension may be released to cause said support and said plastic, thermoplastic sheet to move into said former.

The method according to the present invention further includes the step of moving said support and plastic thermoplastic material into said former by gravity.

According to a further aspect of this invention, there is provided a mould for forming thermoplastic material including a former, a support for thermoplastic material extendable across an upper portion of said former and controlled by a control means, with said support means movable into said former so as to adopt a shape controlled at least partially by said former.

The support may be flexible so as to be formable by said former.

Furthermore, the support is moveable into said former by gravity.

The control means maintains tension on said support means to maintain said support means positioned across said former, to support a plastic sheet of thermoplastic material thereon, prior to formation.

A sleeve means may be positioned between said thermoplastic material and said support.

Shaping means may be provided to urge the plastic thermoplastic material into the former.

The control means may be releasable, to release tension on said support means, to cause said support means to move into said former.

The former may be at least partially arcuate, with mid portions of said arcuate portion positioned remote from said support means prior to plasticizing of said thermoplastic material.

The support may be supported relative to the former by spaced apart distal edge portions of the former prior to release of the support, and as stated above the support means is moved into the former by gravity.

Forming means may also be provided to urge the plasticized thermoplastic material into the former.

The apparatus may be provided for forming thermoplastic sheet material, and such thermoplastic sheet material may be an acrylic sheet material.

Other aspects of this invention which should be considered in all its novel aspects will become apparent from the following description. Modifications are envisioned and may be incorporated without departing from the scope or spirit of the invention.

One form of the invention will now be described with reference to the accompanying drawings in which the apparatus of the invention is depicted in substantially diagrammatic form, as follows.

Figure 1:
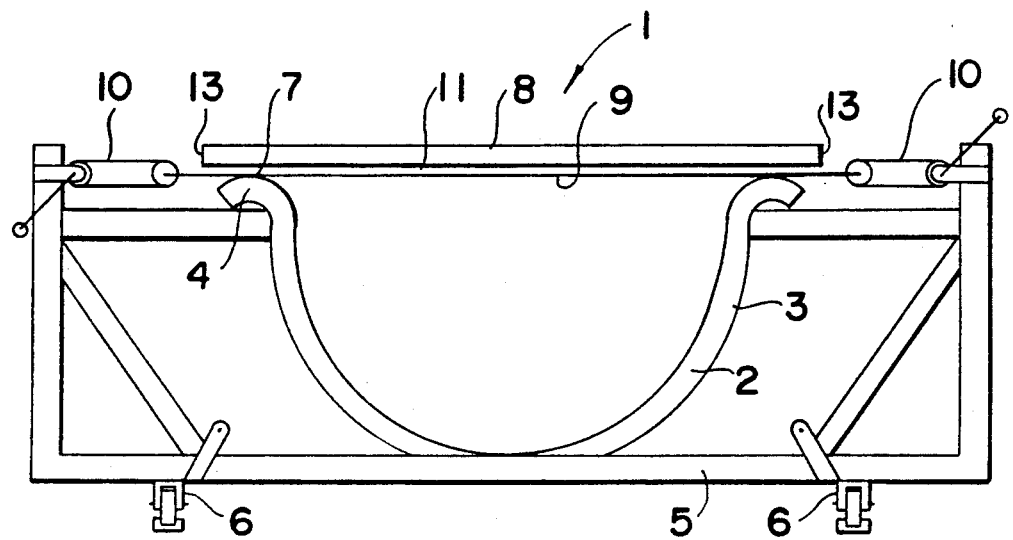
FIG. 1 shows the apparatus of this invention in a substantially rest state prior to formation of the sheet material.

The apparatus of the invention is described with reference to a method and means for moulding thermoplastic material for example acrylic sheet material and the like, into an arcuate configuration so as to preferably be suitable for forming an arcuate viewing roof for a tunnel through a fish tank and the like. However, the invention is not limited to a method for producing such an item, and it is to be appreciated that, in alternative forms of the invention, the method and apparatus can be used for producing any formed material from thermoplastic sheet material.

In the preferred form of the invention, the apparatus as generally indicated by arrow 1 is preferably provided in conjunction with a furnace (not shown) or oven (not shown) which is heatable to a predetermined temperature which effects plasticization of the thermoplastic sheet material.

In the preferred form of the invention, the oven is substantially static and has large side doors, the apparatus of this invention being mounted on rails or on wheels so that the apparatus of the invention can be installed into the oven and thereafter be slowly heated to the predetermined temperature heating the thermoplastic material to the predetermined temperature whereupon the formation of the thermoplastic material can be undertaken.

Referring now particularly to the drawings, the apparatus as generally indicated by arrow 1 includes a U-shaped former 2 which in this preferred form of the invention is preferably provided as a plurality of spaced apart substantially arcuate rails 3 being substantially inwardly dished to define a curved upwardly facing recess, with distal portions 4 of the recessed portion having outwardly convex portions. Preferably, the former rails 3 are mounted on a frame 5 which has ground wheels 6 for rolling on the ground or on rails as described hereinbefore. Further, the oven is not shown.

A support means 7 is provided to extend across the recessed portion of the former and the arcuate distal portions 4 thereof. The support means 7 in this preferred form of the invention comprises of a relatively thin sheet of metal, for example, mild steel.

Preferably, the support means 7 is of a slightly greater size than the size of a sheet of thermoplastic material 8 to be formed by the method and apparatus of this invention. In particular, end portions 9 of the support means 7 are connected with the frame 5 via actuable control means 10. In the preferred form of the invention actuable control means 10 include adjustable chain block arrangements, wire ropes on pulleys and the like, controlled by, for example, winch means mounted to the frame so as to facilitate the positioning of the support means 7 over the former 2, and to maintain the support means 7 under tension whilst it is in a first phase substantially as is shown by FIG. 1.

In the preferred form of the invention, a sleeve means 11, for example, of a cloth or similar soft material, is positioned above the support means 7 so that the sheet 8 is separated from the support means 7. This reduces the likelihood of surface damage to the sheet of thermoplastic material 8 when it is supported thereon.

Figure 2:
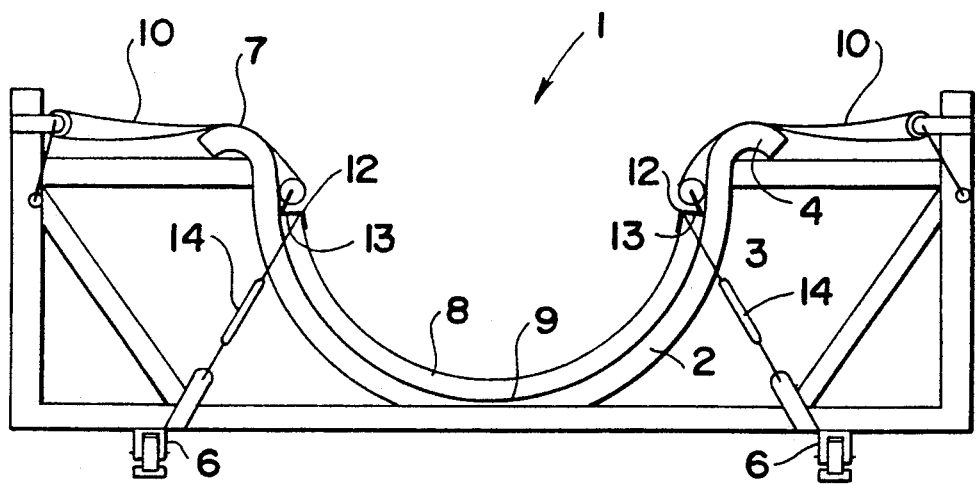
FIG. 2 shows the apparatus of this invention with the acrylic sheet in a formed condition.

Now referring to FIGS. 1 and 2, in the preferred form of the invention, the sheet of thermoplastic material 8 is preferably positioned on the support means 7 with the sleeve 11 sandwiched therebetween. Furthermore, positioning of the sheet 8 is preferably arranged according to predetermined marks and further, and the support means 7 is maintained under considerable tension by adjustment of the control means 10. This enables the support means 7 to support the weight of itself and the sheet 8 when resting on the distal portions 4 of the former 2.

In this condition, the apparatus is then installed in an oven and the whole apparatus and the sheet of thermoplastic material 8 is heated to a temperature whereby the thermoplastic sheet is sufficiently plastic to be formed.

Thereafter, the oven is preferably opened and the apparatus with the plastic thermoplastic sheet 8 thereon is removed from the oven and the control means 10 is released. It will be appreciated that upon release of the control means 10, gravity acting on the support means 7 and the plastic thermoplastic sheet 8 causes the support means 7 and plastic thermoplastic sheet 8 combination to depend downwardly into said former, into the position substantially as shown by FIG. 2. The positioning of the sheet 8 relative to the former can be adjusted by operation of the control means 10 until the plastic, thermoplastic sheet 8 is held in the predetermined and required position in the former, and adopts the shape controlled by the former. Thereafter, the apparatus is allowed to slowly cool. Alternatively, when necessary the apparatus can be returned to the oven for controlled cooling or perhaps annealing of the sheet material.

Referring particularly to FIG. 2, in the preferred form of the invention, it is contemplated that further urging of the plastic thermoplastic sheet material might be required to ensure that the shape of the thermoplastic sheet is accurately controlled. In this arrangement, engagement means 12 in the form of elongate angle pieces, preferably formed of metal or other robust material, are engaged along adjacent opposing end edges 13 of the thermoplastic material. Further urging means 14 are engaged between the engagement means 12 and lower portions of the frame, preferably slightly outwardly of a line directly beneath the end edges 13, so as to effect a substantially compressive force on end portions of the thermoplastic material 8. This action urges the thermoplastic material completely into the former and thus controls, in a substantially more accurate manner, the shape into which the former forms the thermoplastic material.

It is noted that in alternative forms of the invention, the urging means may be dispensed with.

It will be appreciated that once the thermoplastic material has cooled, it retains substantially the shape as formed and may thereafter be removed from the forming apparatus for subsequent formation and installation.

Thus by this invention there is provided a method and apparatus of forming thermoplastic material.

Whilst the invention has been described with reference to one form, modifications are envisioned and may be incorporated without departing from the scope or spirit of the invention, as defined in the appended claims.

What is claimed is:

1. A method of forming a thermoplastic material comprising supporting a sheet of thermoplastic material in a supporting condition on a support spanning a substantially U-shaped former by providing an outward tension on said support, heating at least said sheet of thermoplastic material which is in said supporting condition to a predetermined temperature to render said thermoplastic material plastic, then releasing said outward tension on said support thereby causing said support and said sheet of thermoplastic material supported thereon to depend downwardly solely by gravity into said former due to the weight of said sheet of thermoplastic material, and allowing said sheet of thermoplastic material which has depended downwardly solely by gravity into said former to cool in a shape defined by said former.

2. The method of forming a thermoplastic material according to claim 1, including the step of holding said sheet of thermoplastic material in said former during cooling of said sheet of thermoplastic material.

3. The method of forming a thermoplastic material according to claim 1, including the step of positioning a sleeve portion between said support, and said sheet of thermoplastic material.

4. The method of forming a thermoplastic material according to claim 1, including the step of providing an oven into which said former and said sheet of thermoplastic material is moved.

5. The method of forming a thermoplastic material according to claim 1, wherein said sheet of thermoplastic material is an acrylic sheet material.

* * * * *